W. E. BOCK.
POWER TRANSMISSION MECHANISM.
APPLICATION FILED MAR. 26, 1910.
985,774.
Patented Mar. 7, 1911.
4 SHEETS—SHEET 4.
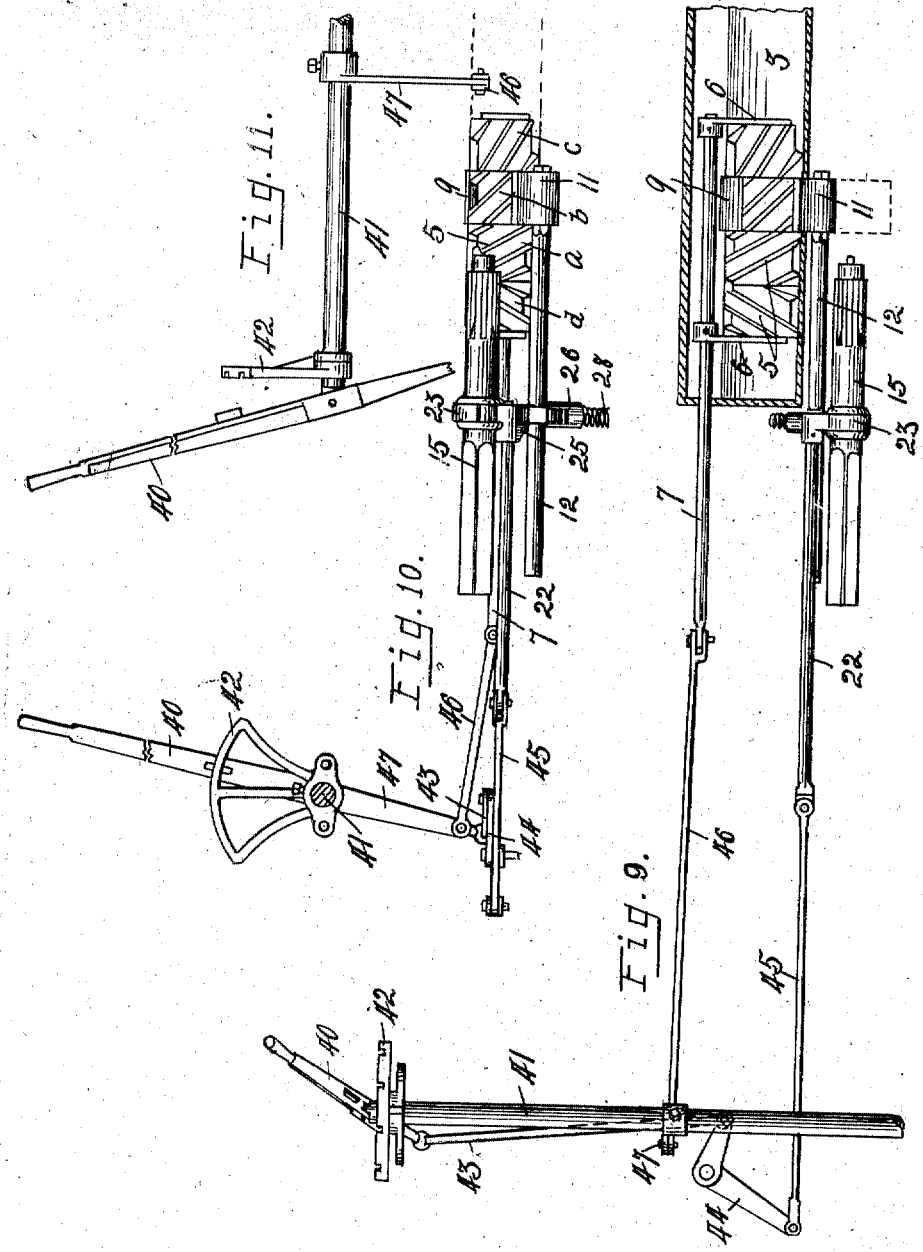
WITNESSES:
D. C. Walter
G. H. Bills
INVENTOR.
Wm. Emil Bock.
By Owen & Owen,
His attys.

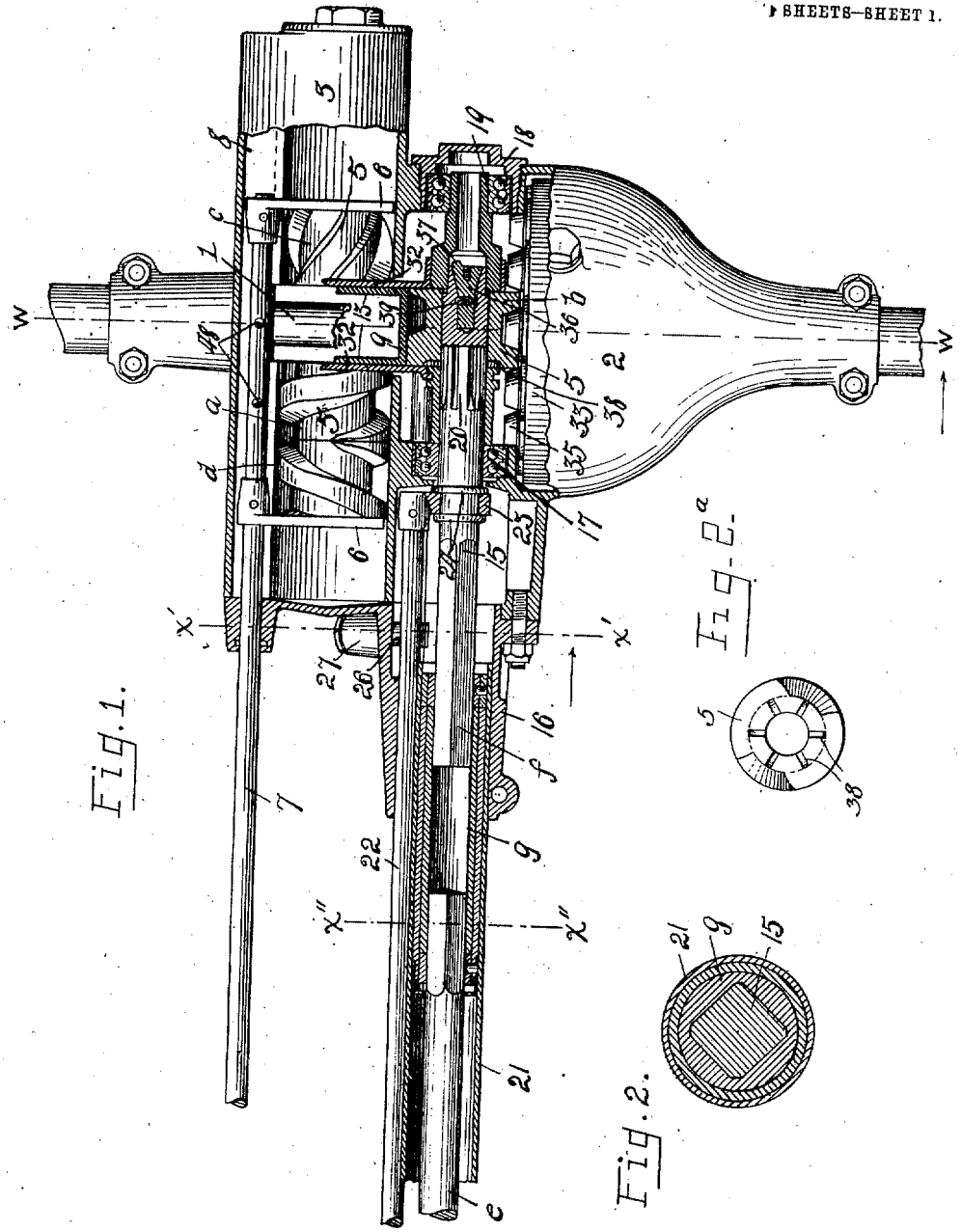

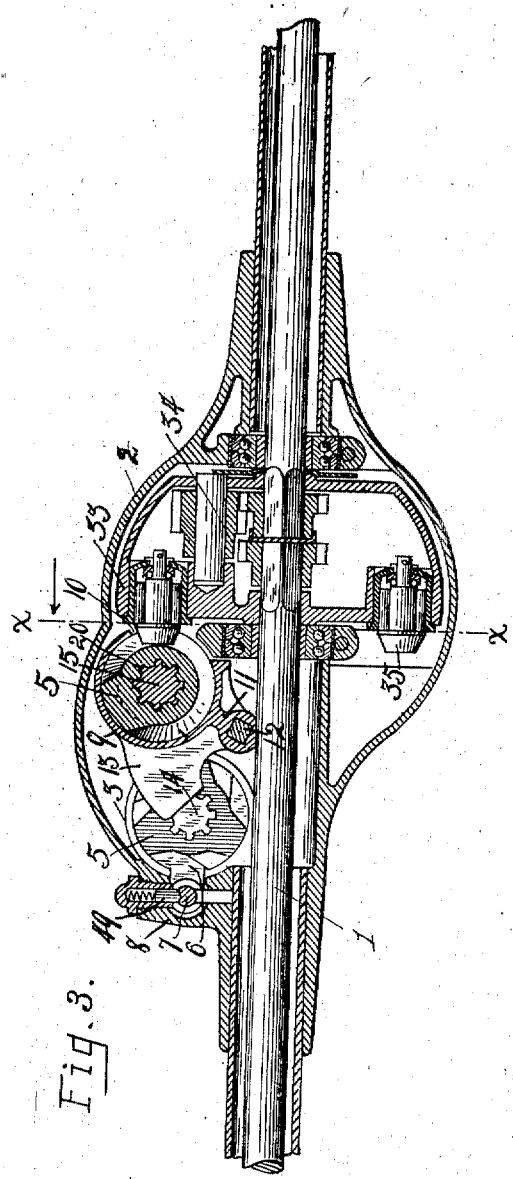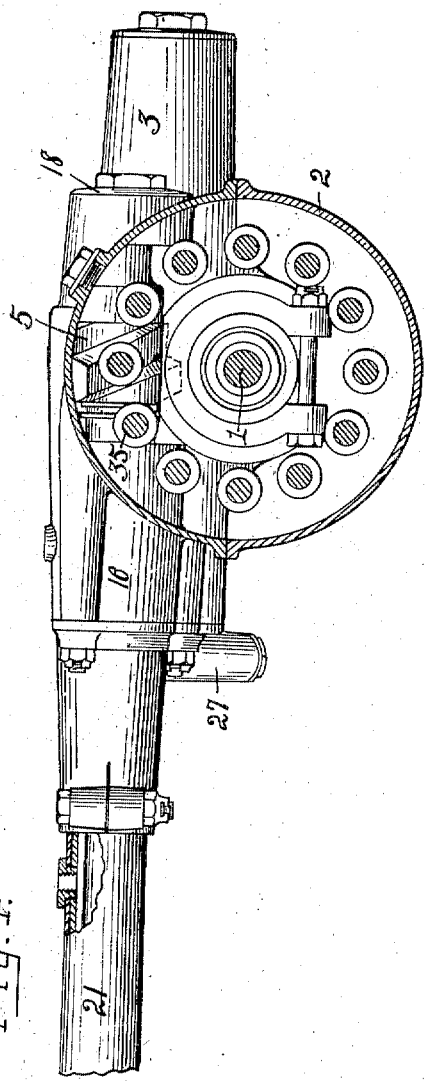

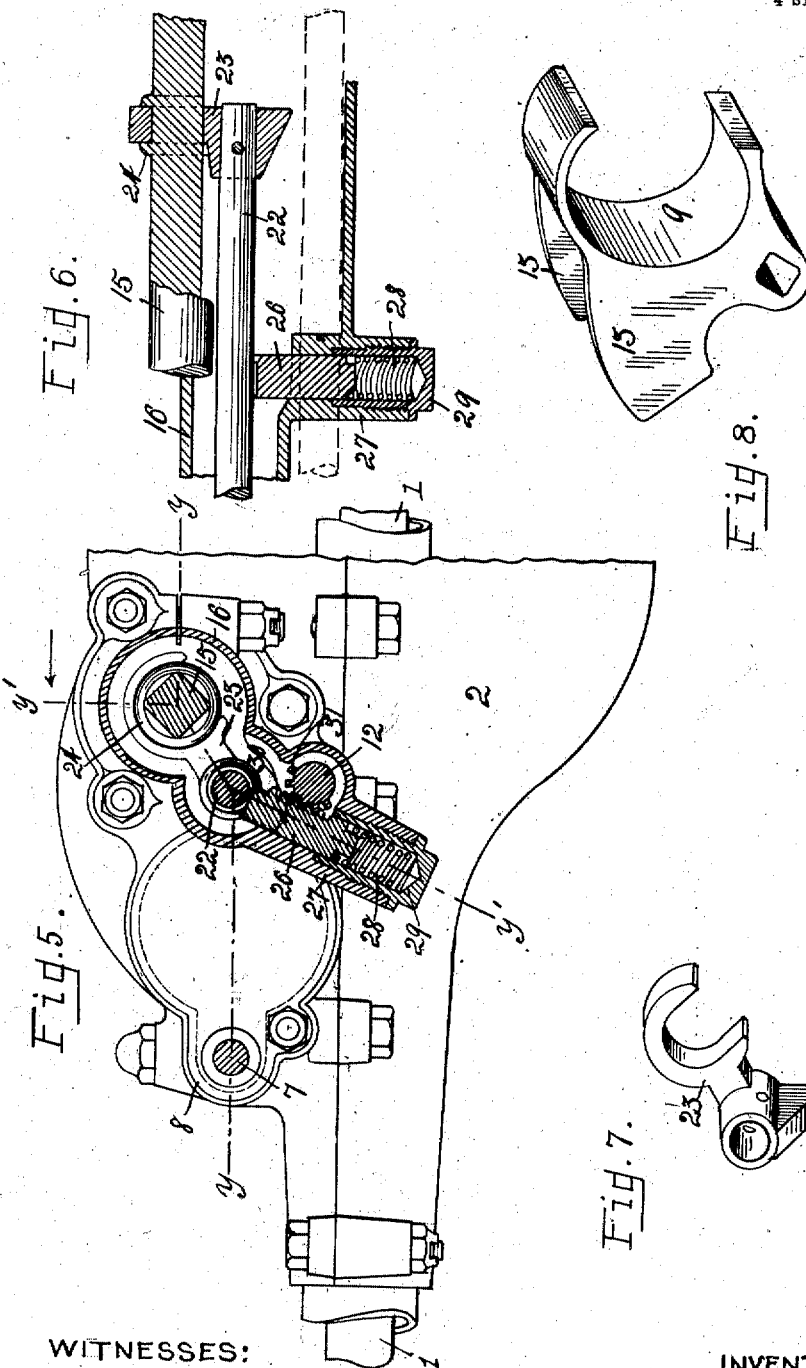

UNITED STATES PATENT OFFICE.

WILLIAM EMIL BOCK, OF TOLEDO, OHIO.

POWER-TRANSMISSION MECHANISM.

985,774.     Specification of Letters Patent.     Patented Mar. 7, 1911.

Application filed March 26, 1910. Serial No. 551,704.

*To all whom it may concern:*

Be it known that I, WILLIAM EMIL BOCK, a citizen of the United States, and a resident of Toledo, in the county of Lucas and State of Ohio, have invented a certain new and useful Power-Transmission Mechanism; and I do hereby declare the following to be a full, clear, and exact description of the invention, such as will enable others skilled in the art to which it appertains to make and use the same, reference being had to the accompanying drawings, and to the figures and letters of reference marked thereon, which form a part of this specification.

My invention relates to power transmission mechanisms of the class adapted particularly for use on motor road vehicles for communicating rotation in either direction at variable speeds to a driven part or parts from a shaft or driving member which is continuously driven in one direction at uniform speed, but is not restricted to such use as it may be employed in any other connection for which it may be adapted or appropriate.

The object of my invention is the provision of an improved and highly efficient apparatus of this class which is compact, simple, strong and durable in its construction, easy of operation and composed of a minimum number of parts, whereby to reduce the weight and cost of construction, repair and maintenance of mechanisms of this type.

A further object of my invention is the provision of an improved direct drive between the driving and driven parts, whereby to avoid the usual intermediate speed and reversing gears commonly used in mechanism of this type and the consequent power losses incident to the use of such forms of mechanisms.

The invention is fully described in the following specification, and while in its broader aspect it is capable of being embodied in numerous forms, a preferred embodiment of the same is illustrated in the accompanying drawings, in which,—

Figure 1 is a plan view of the mechanism embodying my invention, with a portion in section substantially on line $y\ y'$ in Fig. 5. Fig. 2 is a cross-section on the line $x''\ x''$ in Fig. 1. Fig. 2ª is an end view of a worm section. Fig. 3 is a section on the line $w\ w$ in Fig. 1. Fig. 4 is a section on the line $x\ x$ in Fig. 3, with a portion broken away. Fig. 5 is a section on the line $x'\ x'$ in Fig. 1. Fig. 6 is a partial section on the line $y'\ y'$ in Fig. 5. Fig. 7 is an enlarged perspective view of the cam member of the shaft-shifting parts. Fig. 8 is a similar view of the worm shifting section of the worm-casing. Fig. 9 is a plan of the controlling mechanism and a portion of the associated transmission mechanism, with the parts in shaft retracted position. Fig. 10 is a side view of the same, and Fig. 11 is a front elevation of portions of the controlling lever, its carrying shaft and associated parts.

Referring to the drawings, 1 designates the driven shaft of the mechanism, or in the present instance, the driving-axle of the vehicle, which shaft or axle loosely carries a case or housing 2 in which the customary differential mechanism and the power transmission mechanism comprising my present invention are shown as being located.

The case 2 is provided, in the present instance, in the top portion thereof, with the horizontally-disposed transversely-extending magazine 3 within which are mounted a plurality of worm sections 5 for longitudinal or axial shifting movements. These are held together or against relative endwise movements by the arms 6, 6 between which they are disposed, as shown in Fig. 1, which arms project from a shifting rod 7, which is mounted for longitudinal movements in a side portion 8 of the casing of the magazine 3 and has its movements controlled as hereinafter described. The worm sections 5 are of equal length and are shown in the present instance as being four in number and designated $a$, $b$, $c$ and $d$, the first three having their threads adapted for low, intermediate and high speed driving, respectively, and the last having its thread adapted for reverse driving, as will be apparent by reference to Fig. 1.

The magazine 3 is provided at or adjacent its center with a transversely shiftable part 9, which is equal in length to a worm section and has an opening 10 in its top portion to expose the side of a worm carried thereby. This shiftable part is provided at one side thereof with an arm or boss 11, see Figs. 3 and 8, which is mounted on a rock-shaft 12 adjacent the inner lower portions of the magazine to adapt such part to be shifted in an oscillatory manner by a turning of the shaft, which turning is effected as hereinafter described. To prevent a displacement of the worm sections within the magazine when the part 9 has been shifted out of register therewith, the part 9 has fins 13 projecting from its under side at the ends thereof, which fins, on a shifting of the part 9 out of register with the magazine, work up into the opening or space left by the part 9 and shifted worm-section and prevent a longitudinal movement of the remaining worm sections within the magazine to fill such space, as would otherwise be possible.

A worm-section 5 when shifted by a movement of the shifting part 9 out of register with the magazine 3 is swung into position for its shaft opening 14 to axially register with the associated end of a drive-shaft 15. This shaft, which may be the motor-shaft of the vehicle, projects within a transversely-disposed portion 16 of the case or housing 2 and is shown as being mounted within a suitable bearing 17 within such portion 16 for limited longitudinal shifting movements therein to permit it to be projected through or withdrawn from the opening 14 of a registering worm section. The outer end of the casing part 16 is shown as being closed by a removable plug 18, which carries suitable bearing means 19 for the associated end of the shaft 15 when projected through a registering worm section 5, as indicated in Fig. 1. The shaft 15 has its end longitudinally ribbed as at 20, to adapt it to interlock with complemental grooves within the openings of the worm sections to drive such sections.

To facilitate a longitudinal shifting of the shaft 15 it is shown in the present instance as comprising the non-shiftable section *e* and the shiftable section *f*, which are connected for relative shifting movements by a coupling part *g*.

21 designates an inclosing case for the shaft 15.

The shifting movements of the shaft section *f* are actuated by longitudinal movements of the shifting-rod 22, which works through a portion of the casing part 16 at one side of the shaft 15 in parallelism therewith, and is provided at its inner end with a forked-arm 23 which loosely straddles said shaft section intermediate a set of peripheral ribs or shoulders 24 thereon. The hub portion of the arm 23 is shown as being provided on its underside with a cam surface 25, which, when the shaft has receded from engagement with a worm and the rod 22 is near the limit of its outward shifting movements, coacts with an end of a registering pin or plunger 26 to longitudinally move the same. This pin or plunger is mounted in a socketed casing part 27 for movements toward and away from the rod 22, and is influenced to normally move toward such rod by the action of a coiled compression spring 28 between the outer end of such pin and the cap 29, which cap closes the outer end of the socket in which it is disposed.

The pin 26 is provided on one side with a series of rack teeth 30 in mesh with a segmental pinion or series of teeth 31 on the rock-shaft 12, whereby longitudinal movements of the pin 26 effect rocking movements of the shaft 12 to shift the casing part 9 and worm section carried thereby from within the casing part 3 to drive-shaft engaging position, or vice versa. The arrangement of the pin 26 and pinion 31 is such that upon an outward movement of the pin, which is effected by the cam 25 when the rod 22 is nearing the limit of its shaft retracting movement, the shifting part 9 and worm carried thereby are swung into register with the magazine 3, and that upon an inward movement of the pin, which is caused by the spring 28 when the cam 25 is moved upon an inward shifting of the rod 22, the shaft 12 will be rocked to throw the part 9 and inclosed worm into position for the worm to receive the advancing end of the drive-shaft 15.

On a shifting of a worm section from the magazine 3 to drive-shaft engaging position it is prevented from endwise movements within the shifting part 9 by stationary guide flanges or wings 32, which project from the shaft bearing parts 17 and 19 at the sides of the path of swinging movements of the part 9 as indicated in Fig. 1 and terminate adjacent the side of the magazine 3.

A worm section 5 when thrown into drive-shaft engaging position meshes with the teeth of a crown-gear 33, which is mounted on the axle 1 and is shown in the present instance as carrying a part of the differential mechanism 34 of the machine. The teeth 35 of this gear comprise truncated cone shaped rollers, which are suitably mounted in the face of the gear for rotary movements relative thereto. As the outer end or face of a thread of a worm-section, when thrown up to mesh with the gear 33, might strike against a registering tooth 35 and prevent a meshing of such parts, especially when the gear 33 is standing still, the drive shaft 15 has a plug member 36 inserted in the adjacent end thereof and provided at one side of its outer end with a tooth 37, which, upon a forcing of the shaft end into contact with the worm section end, the opening 14 of which latter is out of axial register with the shaft end, engages in one of a series of notches 38 (Fig. 1) in the worm end and effects a turning of the worm to move its groove into mesh with the gear teeth, as is apparent. The plug 36 is yieldingly held within the shaft end by a spring pressed detent 39 engaging in an annular groove in the shaft socket.

Referring to Figs. 9, 10 and 11, 40 designates a controller-lever, which is carried by an end of a rock-shaft 41 for relative oscillatory movements longitudinally thereof, but is adapted when oscillated transversely thereof to rock the shaft therewith. The shaft 41 is suitably journaled in the vehicle frame (not shown) transversely of the drive-shaft 15. The lever 40, when standing in a vertical plane, is adapted to engage one of a number of notches in the side of a segment 42 secured to an adjacent frame part (not shown), and has its lower end projected below the shaft 41 and in ball-and-socket or universal connection with the outer end of a rod or link 43. This rod is disposed transversely of the vehicle frame (not shown) and has its inner end connected to an arm of the bell-crank lever 44, which is fulcrumed to a vertical stud or shaft adjacent the center of the shaft 41. The other arm of the lever 44 is connected to an end of a rod 45, which pivotally connects at its other end to the outer end of the shifting rod 22, thus adapting an oscillation of the controller-lever 40 longitudinally of the shaft to communicate shifting movements to the drive-shaft 15 through the medium of the rods 43, 45 and 22 and the bell-crank lever 44. On a rocking of the shaft 41 a longitudinal shifting movement is imparted to the shift-rod 7 to axially move the worm sections 5 within the magazine 3 and place a desired one of the same within the shifting part 9, due to a rod 46 connecting the shift-rod 7 to a vertically-disposed arm 47 on the shaft 41. To facilitate a stopping of the shift-rod 7 at predetermined points to place any worm in position to be swung from the magazine 3 to mesh with the gear 33, the rod 7 is provided with properly spaced depressions 48 (Fig. 1) with which a spring-pressed detent 49 mounted in a socket in the casing part 8 (Fig. 8) engages.

In the use of my invention it is evident that to change the speed at which the gear 33 and associated parts are being driven, or to reverse the direction of rotation thereof, it is only necessary to swing the controller-lever 40 outward from engagement with the segment 42 then transversely of the shaft 41 into a transverse plane with the desired notch in such segment, and then back toward the segment to place it into engagement with such notch. On the outward movement of the control-lever the rod 43 at the lower end thereof is thrown inwardly to impart a rocking movement to the bell-crank-lever 44 and a consequent movement of the rods 22 and 45 in the direction of the shaft 41. Upon such movement of the rod 22 the attached shiftable section f of the shaft 15 is moved out of engagement with the registering worm section 5, and the cam surface 25 when near the limit of its retracting movement, acts on the rack-pin 26 to effect an outward movement thereof, such contact of the cam and pin, however, not taking place until the shaft end has completely receded from engagement with a worm. The movement thus imparted to the pin 26 communicates a rocking movement to the rock-shaft 12, through the medium of the meshing teeth 30 and 31 on said pin and shaft, and a consequent swinging of the magazine part 9 and inclosed worm 5 away from the gear 33 and into register with the magazine 3 to permit a shifting of the worm sections through the part 9. The control-lever 40 is now swung transversely of the shaft 41 to rock it and shift the rod 7 a predetermined distance to move the desired worm 5 into the shiftable magazine part 9. This being done the lever 40 is swung toward the segment 43 to engage in the registering notch therein, thus shifting the rod 22 to first move the cam 25 from engagement with the pin 26 to permit such pin to return to its normal position under the influence of the spring 28 whereby to rock the shaft 12 to swing the part 9 and selected worm 5 into position for the latter to mesh with the gear 33, and then to move the end of the drive shaft into the opening 14 of such worm to drive the same. Should the worm be prevented from meshing with the gear, due to the ends of the respective threads and teeth striking, the tooth 37 at the end of the shaft 15 engages a notch 38 in the worm end to rotate the same to move it into position to mesh with a gear tooth. It is thus apparent that the worm sections 5 when not in use are carried within a magazine in which they may be shifted to selectively place the same in position to be moved to gear engaging position, and that a shifting of the drive-shaft to release or engage a worm, a shifting of a worm section to move the same from the magazine to gear meshing position, and vice versa, and a shifting of the worm sections within the magazine to place the desired one into position to be shifted to engage the gear, are all effected by movements of a single control-lever.

I wish it understood that my invention is not limited to any specific construction or arrangement of the parts except in so far as such limitations are specified in the claims.

Having thus described my invention, what I claim as new and desire to secure by Letters Patent, is,—

1. In a power transmission mechanism, the combination of a drive-shaft, a driven member, a plurality of worm sections which are shiftable relative to each other to selectively mesh with said driven member, and mechanism operative to shift the worm sections and move the drive-shaft to engage or release the same.

2. In a power transmission mechanism, the combination with a drive shaft and a driven shaft, of a gear wheel connected to the driven shaft, a multiple of variable speed gears which are shiftable relative to each other and capable of being driven by the drive shaft, and means for selectively meshing each variable gear with the driven gear and engaging it with the drive shaft.

3. In a power transmission mechanism, the combination of a drive shaft, a driven shaft journaled transversely thereof, a gear on the driven shaft, a multiple of variable speed gears which are shiftable relative to each other, and means for causing any of the variable gears to mesh with the driven gear and be engaged by the drive shaft.

4. In a power transmission mechanism, the combination of a drive shaft, a driven shaft, a gear on said driven shaft, a plurality of longitudinally and laterally shiftable worm sections, and mechanism operative to shift the worm sections to selectively engage the drive shaft and gear.

5. In a power transmission mechanism, the combination of drive means, a driven gear, a plurality of longitudinally and laterally shiftable worm sections, and mechanism operative to shift the worm sections to selectively engage the drive means and said gear.

6. In a power transmission mechanism, the combination of a longitudinally shiftable drive shaft, a driven gear, a plurality of longitudinally and laterally shiftable worm sections, and mechanism operative to shift the worm sections to selectively mesh with the gear and to shift the shaft to engage or release a shifted worm section.

7. In a power transmission mechanism, the combination of a longitudinally shiftable drive shaft, a driven gear, a plurality of worm sections of variable leads and capable of shifting movements relative to each other, and mechanism operative to selectively shift the worm sections to mesh with the gear and to shift the shaft to engage or release a shifted section.

8. In a power transmission mechanism, the combination of drive means, a driven gear, a plurality of worm sections capable of lateral shifting movements relative to each other, means guiding the shifting movements of such sections, and means for shifting the worm sections to selectively engage the drive means and gear.

9. In a power transmission mechanism, the combination of drive means, a driven gear, a magazine, a plurality of worm sections shiftable in said magazine, and means operative to laterally shift the worm sections relative to each other to selectively engage the drive means and driven gear.

10. In a power transmission mechanism, the combination of drive means, a driven gear, a magazine having a shiftable part, a plurality of worm sections mounted for shifting movements within such magazine and being relatively shiftable by a movement of such part, and mechanism for shifting the worm sections within the magazine and shifting such part to selectively place a worm section into position to engage with the drive means and driven gear.

11. In a power transmission mechanism, the combination of drive means, a driven member, a plurality of axially shiftable worm sections, guide means for such shifting movements of the worm sections, means for shifting a predetermined one of the worm sections into position to communicate motion from the drive means to said member, and mechanism for axially shifting said worm sections and actuating said worm shifting means to place a worm section into position to communicate movement from the drive means to said member.

12. In a power transmission mechanism, the combination of drive means, a driven member, a magazine having a laterally shiftable part, a plurality of worm sections mounted for axial shifting movements within said magazine, a mechanism for axially shifting the worm sections to selectively place the same within said shiftable part and to actuate said part to move a worm section into position to communicate rotation from the drive means to said driven member.

13. In a power transmission mechanism, the combination of a drive shaft, a driven member, a magazine disposed at a side of such shaft, a plurality of relatively shiftable worm sections carried by such magazine and mechanism for moving such worm sections to communicate rotation from the drive shaft to said member.

14. In a power transmission mechanism the combination of a drive shaft, a driven member, a magazine at a side of such shaft, a plurality of worm sections axially shiftable in such magazine, a mechanism for shifting the worm sections within such magazine, laterally shifting a predetermined one of such sections to engage a driven member and shifting the shaft to engage or release such shifted section.

15. In a power transmission mechanism, a drive shaft, a driven member, a magazine having a laterally swinging part, a plurality of worm sections mounted for axial movements within the magazine and through such part, means movable to shift the sections within such magazine to selectively place the same within said part, and means operative to effect a swinging of such part to place a worm section into position to communicate rotation from the drive shaft to said member.

16. In a power transmission mechanism, a longitudinally shiftable drive shaft, a driven member, a magazine, a plurality of relatively shiftable worm sections mounted in said magazine, means for shifting the worm sections within the magazine, and means operative to shift the shaft and move a worm section into or from shaft and member engaging position at a predetermined point in the shifting movements of such shaft.

17. In a power transmission mechanism, a longitudinally shiftable drive shaft, a driven member, a plurality of worm sections, axially and laterally shiftable to selectively engage such shaft and member, means for axially shifting the worm sections, and means for shifting the shaft and actuating the lateral shifting movements of a worm section at a predetermined point in the shifting movements of the shaft.

18. In a power transmission mechanism, a longitudinally shiftable drive shaft, a driven member, a magazine having a laterally swinging part, a plurality of worm sections axially shiftable in such magazine through such part, a shaft carrying such part, means for axially shifting the worm sections within the magazine, and means for shifting the drive shaft and rocking said part-carrying shaft to selectively move a worm section into or out of drive-shaft and member engaging position and moving the shaft to engage or release such section.

19. In a power transmission mechanism, a shiftable drive shaft, a driven member, a magazine having an oscillatory part, a plurality of worm sections axially movable in said magazine through such part, means for axially moving such sections, a rock shaft carrying said part and having pinion teeth thereon, a rack-pin in mesh with said teeth, and means for shifting the drive shaft to release an engaged worm section and to actuate said pin to rock the rock shaft to place said part in register with the magazine, and means acting on said pin to normally move said part into position for a worm section carried thereby to mesh with the driven member.

20. In a power transmission mechanism, a shiftable drive shaft, a driven member, a magazine having a laterally shiftable part, a plurality of worm sections axially movable within said mechanism through said part and laterally shiftable by a movement of such part into position to communicate rotation from the drive shaft to said part, means for axially shifting said section, a shaft carrying said part, a pin movable to communicate rocking movements to such shaft, a shift-rod attached to the drive shaft, and cam means carried by such rod for acting on said pin to move the same in one direction at a predetermined point in the shifting movements of the drive shaft, and means acting on said pin to move it in the opposite direction when released by said cam means.

21. In a power transmission mechanism, a drive-shaft, a driven member, a plurality of worm sections selectively shifting into position to communicate rotation from the drive shaft to said member, means for effecting such shifting movements, and means carried by the drive-shaft for acting on a shifted worm section to turn the same to facilitate its meshing with the driven member.

22. In a power transmission mechanism, a longitudinally shiftable drive member, a driven member, a plurality of worm sections shiftable to position to communicate rotation from said shaft to said member, means for shifting the worm sections and shaft, and means carried by the shaft for acting on a shifted worm section when off center relatively to the shaft to effect a turning thereof to place it into mesh with the driven member.

23. In a power transmission mechanism, the combination of a shiftable drive member, a driven member, a plurality of worm sections relatively shiftable into position to communicate rotation from the drive shaft to the driven member, and a single lever control mechanism operative to selectively shift the worm sections and to shift the shaft to engage or release a shifted worm section.

24. In a power transmission mechanism, a longitudinally shiftable drive shaft, a driven member, a plurality of worm sections relatively shiftable to selectively place the same in position to engage the shaft and driven member, a rod having connection with the worm sections to axially shift the same, means operative to laterally shift a selected worm section to place it into position to communicate rotation from the drive shaft to the driven member and to shift the drive shaft into or out of engagement with a shifted worm section, and a single control lever having operative connection with said means and shaft rod to actuate the shifting movements thereof.

25. In a power transmission mechanism, a drive shaft, a driven member, a magazine having a laterally shiftable part, a plurality of worm sections axially shiftable in the magazine through such part, means for shifting the worm sections within the magazine, and means for shifting said part to place a contained worm section into position to communicate rotation from the drive shaft to said member, said part having means for preventing a movement of the worm sections within the magazine when such part is shifted out of register therewith.

In testimony whereof I have hereunto signed my name to this specification in the presence of two subscribing witnesses.

WILLIAM EMIL BOCK.

Witnesses:
C. W. OWEN,
E. E. THOMAS.